United States Patent Office 2,901,517
Patented Aug. 25, 1959

2,901,517

PREPARATION OF SUBSTITUTED ORTHO-POLY-METHYLENE AROMATIC HYDROCARBONS

Louis Schmerling, Riverside, Ill., assignor, by mesne assignments, to Universal Oil Products Company, Des Plaines, Ill., a corporation of Delaware No Drawing. Application May 10, 1955
Serial No. 507,513

13 Claims. (Cl. 260—668)

This invention relates to a process for preparing substituted ortho-polymethylene aromatic hydrocarbons, and more particularly to a method of preparing novel compositions of matter comprising substituted ortho-polymethylene benzenes.

An object of this invention is to prepare substituted ortho-polymethylene hydrocarbons.

One embodiment of the invention resides in a process which comprises reacting an ortho-polymethylene aromatic hydrocarbon with a compound selected from the group consisting of polyhaloalkanes in which at least two halogen atoms are on the same carbon atom and haloalkenes in the presence of a Friedel-Crafts type catalyst, and recovering the resultant condensation products.

A specific embodiment of the invention resides in a process which comprises reacting an ortho-polymethylene benzene with a compound selected from the group consisting of polyhaloalkanes in which at least two halogen atoms are on the same carbon atom and haloalkenes in the presence of aluminum chloride, and recovering the resultant condensation products.

A more specific embodiment of the invention resides in a process which comprises reacting 1,2,3,4-tetrahydronaphthalene with 1,1-dichloroethane in the presence of aluminum chloride, and recovering the resultant condensation products.

Other objects and embodiments referring to alternative ortho-polymethylene aromatic hydrocarbons and alternative polyhaloalkanes in which at least two halogen atoms are on the same carbon atom and alternative haloalkenes will be found in the following further detailed description of this invention.

It has now been discovered that ortho-polymethylene aromatic compounds may be caused to undergo "self-alkylation" by treatment with a particular type of polyhaloalkane or with a haloalkene, as hereinafter defined, in the presence of a catalyst of the Friedel-Crafts type, particularly aluminum chloride or aluminum bromide. The reaction is accompanied by the formation of an alkyl-ortho-polymethylene aromatic hydrocarbon, the alkyl group of which corresponds to that derived from the polyhaloalkane or haloalkene. The reaction may be illustrated by the following equation:

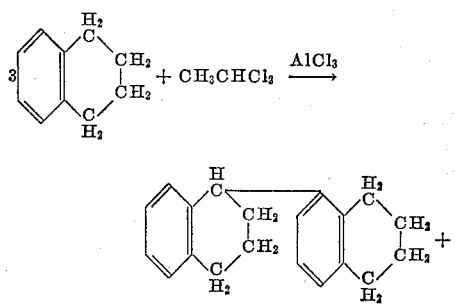

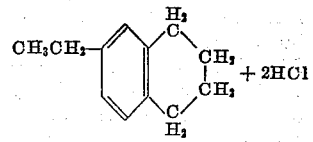

The products resulting from such condensations find varied uses in the chemical industry, said condensation products being used as intermediates in the preparation of pharmaceuticals, resins, plastics, detergents, etc. For example, tetrahydronaphthyltetrahydronaphthalene resulting from the condensation of 1,2,3,4-tetrahydronaphthalene (tetralin) and 1,1-dichloroethane may be sulfonated with sulfuric acid to form the sulfonic derivative of tetrahydronaphthyltetrahydronaphthalene which may be used as a detergent. It may be nitrated and the resulting dinitro derivative reduced to a diamine which, as such or after introduction of alkyl groups, particularly on the nitrogen atoms, is useful as an oxidation inhibitor in oils and fats.

Ortho-polymethylene aromatic compounds which may be reacted with a halogenated hydrocarbon according to the process of this invention include 1,2,3,4-tetrahydronaphthalene (tetralin), indan, 5-methyl-1,2,3,4-tetrahydronaphthalene, 6-methyl-1,2,3,4-tetrahydronaphthalene, etc., 5-ethyl-1,2,3,4-tetrahydronaphthalene, 6-ethyl-1,2,3,4-tetrahydronaphthalene, etc., 4-methylindan, 4-ethylindan, 5-methylindan, 5-ethylindan, 1,1-dimethylindan, etc., 1,2,3,4-tetrahydroanthracene, 5-methyl-1,2,3,4-tetrahydroanthracene, 6-methyl-1,2,3,4-tetra-hydroanthracene, 9-methyl-1,2,3,4-tetrahydroanthracene, 5-methyl-1,2,3,4-tetrahydrophenanthrene, 5-ethyl-1,2,3,4-tetrahydrophenanthrene, 6-methyl-1,2,3,4-tetrahydrophenanthrene, 6-ethyl-1,2,3,4-tetrahydrophenanthrene, etc. The preferred ortho-polymethylene aromatic hydrocarbons are those in which at least one of the carbon atoms attached to the aromatic nucleus is attached to at least one hydrogen atom.

It is to be understood that the above mentioned ortho-polymethylene aromatic compounds are only representatives of the classes of compounds which may be used in the process of this invention and that said invention is not necessarily limited thereto.

The halogen-containing compounds which may be used in the process of this invention include polyhaloalkanes, the preferred halogen atoms being chlorine and bromine, in which at least two halogen atoms are on the same carbon atom. The term "polyhaloalkane" includes both aliphatic and cycloaliphatic halides such as exemplified by 1,1-dihaloalkanes, 1,1-dihalocycloalkanes, and 1,1-dihaloalkylcycloalkanes. Suitable halides include carbon tetrachloride, chloroform, bromotrichloromethane, tribromomethane, carbon tetrabromide, 1,1-dichloroethane, 1,1-dibromoethane, 1,1,2-trichloroethane, 1,1,2-tribromoethane, 1,1-dichloropropane, 1,1,2-trichloropropane, 1,1-dibromopropane, 1,1,2-tribromopropane, 1,1,3,3-tetrachloropropane, 1,1,3,3-tetrabromopropane, 1,1-dichlorobutane, 2,2-dichlorobutane, 2,2-dibromobutane, 1,1,2-trichlorobutane, 1,1,3-trichlorobutane, 1,1,2-tribromobutane, 1,1,3-tribromobutane, polychlorinated and polybrominated pentanes, hexanes, etc.; 1,1-dichlorocyclopentane, 1,1-dibromocyclopentane, 1,1-dichlorocyclohexane, 1,1-dibromocyclohexane, etc. Polyhaloalkanes containing at least two halogen atoms on a primary carbon atom, which are characterized by containing a quaternary carbon atom, such as those which may be obtained, for example, by the reaction of a saturated tertiary halide (i.e. a tertiary alkyl or cycloalkyl halide such as tertiary butyl chloride or 1-methyl-1-chlorocyclohexane) with a vinyl halide or other haloalkene may also be used in this invention, said polyhaloalkanes including 1,1-dichloro-2,2-dimethylpropane, 1,1-dibromo-2,2-dimethylpropane, 1,1-dichloro-3,3- dimethylbutane, 1,1 - dibromo - 3,3-dimethylbutane, 1,1,2-trichloro - 3,3 - dimethyl - butane, 1,1,2-tribromo-3,3-dimethylbutane, 1,1 - dichloro - 3 - methyl - 3 - ethylbutane, 1,1 - dibromo - 3-methyl-3-ethylbutane, 1,1,2-trichloro-3-methyl - 2 - ethylbutane, 1,1,2-tribromo-3-methyl-3-ethylbutane, 1,1 - dichloro - 3,3 - diethylbutane, 1,1-dibromo-3,3 - diethylbutane, 1,1,2 - trichloro - 3,3 - diethylbutane, 1,1,2 - tribromo - 3,3 - diethylbutane, 1,1 - dichloro - 3,3-dimethylpentane, 1,1 - dibromo - 3,3 - dimethylpentane, 1,1,2 - trichloro - 3,3 - dimethylpentane, 1,1,2 - tribromo-3,3 - dimethylpentane, 1,1, - dichloro - 3,3 - diethylpentane, 1,1 - dibromo - 3,3 - diethylpentane, 1,1,2 - trichloro-3,3-diethylpentane, 1,1,3 - tribromo - 3,3 - diethylpentane, 1,1 - dichloro - 4,4 - dimethylpentane, 1,1 - dibromo - 4,4-dimethylpentane, 1,1 - dichloro - 4,4 - methyl - 4 - ethylpentane, 1,1 - dibromo - 4 - methyl - 4 - ethylpentane, 1,1 - dichloro - 3,3 - dimethylhexane, 1,1 - dichloro - 4,4-dimethylhexane, 1,1 - dichloro - 5,5 - dimethylhexane, 1,1 - dibromo - 3,3 - dimethylhexane, 2,2 - dichloro, 4,4-dimethylpentane, 1 - (2,2 - dichloroethyl) - 1 - methyl-cyclopentane, 1 - (2,2 - dichloroethyl) - 1 - methylcyclohexane and the like. In addition, haloalkenes, said term "haloalkene" including both mono- and polyhaloalkenes and cycloalkenes, may be used. Said haloalkenes (the preferred halogen atom comprising chlorine and bromine) include vinyl chloride, vinyl bromide, 1,1-dichloroethylene, 1,1-dibromoethylene, trans-1,2-dichloroethylene, cis-1,2 - dichloroethylene, trans - 1,2 - dibromoethylene, cis - 1,2 - dibromoethylene, 1,1,2 - trichloroethylene, 1,1,2-tribromoethylene, allyl chloride, allyl bromide, 1,2-dichloro-1-propene, 1,2-dibromo-1-propene, 2,3-dichloro-1-propene, 2,3 - dibromo-1-propene, 1,1,2-trichloro-1-propene, 2,3,3 - tribromo - 1 - propene, crotyl chloride, crotyl bromide, methallyl chloride, methallyl bromide, 1,2-dichloro - 1 - butene, 1,2-dibromo-1-butene, 1,2-dichloro-2-butene, 1,2 - dibromo - 2-butene, 1,1,2-trichloro-2-butene, 1,1,2 - tribromo - 2 - butene, 3,4-dichloro-1-butene, 3,4-dibromo-1-butene, 2,3-dichloro-1-butene, 2,3-dibromo-1-butene, 2,3 - dichloro - 2-butene, 2,3-dibromo-2-butene, trichlorobutylenes, tribromobutylenes, etc.; 1-chloro-1-cyclohexene and other chlorocyclohexenes, 1,2-dichloro-1-cyclohexene, 1,3,5 - trichlorocyclohexene, 1-bromo-1-cyclohexene and other bromocyclohexenes, 4,5-dibromo-1-cyclohexene, chlorocyclopentenes, bromocyclopentenes, etc.

The reaction conditions under which the process of the present invention proceeds will depend largely upon the type of reactant and the catalyst used. The reaction is carried out in the presence of a Friedel-Crafts type catalyst, the preferred catalysts comprising aluminum chloride, aluminum bromide, zirconium chloride and boron fluoride, although other metallic halides of this class such as ferric chloride may also be used, but not necessarily with equivalent results. Generally speaking, temperatures ranging from about −20° C. to about 150° C. or more will be used in the reaction, the preferred range, especially when aluminum chloride is used to catalyze the reaction, being in the range of from about 0° to about 100° C.

The process of this invention may be effected in any suitable manner and may comprise either a batch or continuous type operation. When a batch type operation is used, a quantity of the starting material, namely the halogenated hydrocarbon and the o-polymethylene aromatic compound are gradually added to a mixture of the ortho-polymethylene aromatic compound and the catalyst in a suitable reaction vessel provided with stirring and heating or cooling means. The vessel is then heated or cooled to the desired temperature depending upon the reactants and catalysts used in the process, while being subjected to thorough mixing. After a predetermined reaction time has elapsed, the desired reaction product is separated from the catalyst layer and recovered from the unreacted starting material by conventional means, for example, by washing, drying and fractional distillation.

Another method of operation of the present process is of the continuous type. A particularly suitable type of operation comprises a fixed bed type in which the condensation catalyst is disposed as a bed in a reaction zone, said zone being maintained at suitable operating conditions of temperature and pressure. The ortho-polymethylene aromatic hydrocarbon and the halogenated compound are passed therethrough in a continuous stream in either an upward or downward flow. Alternatively, a mixture of the ortho-polymethylene aromatic hydrocarbon and the catalyst in one stream, and the halogenated hydrocarbon dissolved, if so desired, in orthopolymethylene aromatic compound in another stream, are introduced into the reaction zone. The condensation of the orthopolymethylene aromatic compound will continue until the desired time has elapsed, after which the reaction product will be continuously withdrawn from the reaction zone and subjected to separating steps hereinbefore set forth. The unreacted starting materials may be recycled for use as a portion of the feed stock while the condensation product will be withdrawn and purified. The reaction zone in which the reaction takes place may comprise an unpacked vessel or coil, or it may contain a packing material such as fire brick, alumina, dehydrated bauxite, and the like.

Other continuous types of processes which may be used in this invention include the fluidized type of operation, the compact moving bed type of operation, and the slurry type process.

The following example is given to illustrate the process of this invention which, however, is not intended to limit the generally broad scope of the present invention in strict accordance therewith.

*Example I*

A solution of 45 g. (0.45 mole) of 1,1-dichloroethane dissolved in 130 g. (1.0 mole) of 1,2,3,4-tetrahydronaphthalene was added to a stirred mixture of 195 g. (1.5 mole) of 1,2,3,4-tetrahydronaphthalene and 5 g. of aluminum chloride at room temperature. Since only a relatively small amount of hydrogen chloride was evolved, the temperature was gradually raised to 58° C. during 3.3 hours, at the end of which time the addition was complete and hydrogen chloride was being evolved quite copiously. Stirring was continued for an additional 3.2 hours during which the temperature was raised to 96° C. A soda lime tower in the exit line gained 25 g. (0.7 mole of hydrogen chloride); more hydrogen chloride was in solution in the liquid product.

The reaction vessel and contents thereof were cooled to room temperature and the liquid reaction product was decanted from the catalyst layer, washed with alkali and water, dried over potassium carbonate and subjected to fractional distillation under reduced pressure. 32 g. (44% of the theoretical yield) of ethyl-1,2,3,4-tetrahydronaphthalene boiling at 75–78° C. at 4 mm. pressure and 48 g. (41% of the theoretical yield) of tetrahydronaphthyltetrahydronaphthalene boiling at 176° to 186° C. at 3 mm. pressure was separated from the reaction mixture. In addition to 42 g. of a high boiling residue was also recovered therefrom.

The tetrahydronaphthyltetrahydronaphthalene was shown to be a mixture of 6-(1,2,3,4-tetrahydro-2-naphthyl)-1,2,3,4-tetrahydronaphthalene and 6-(1,2,3,4-tetrahydro-1-naphthyl)-1,2,3,4-tetrahydronaphthalene and/or 5-(1,2,3,4-tetrahydro-2-naphthyl)-1,2,3,4 - tetrahydronaphthalene by dehydrogenation over platinum catalyst at 275–300° C. to yield the known naphthylnaphthalenes.

I claim as my invention:

1. A process which comprises reacting as the sole reactants in the process an orthopolymethylene aromatic hydrocarbon selected from the group consisting of indans, 1,2,3,4-tetrahydronaphthalenes, 1,2,3,4-tetrahydroanthracenes and 1,2,3,4-tetrahydrophenanthrenes with a compound selected from the group consisting of polyhaloalkanes in which at least two halogen atoms are on the same carbon atom and haloalkenes in the presence of a Friedel-Crafts type catalyst, and recovering the resultant reaction products.

2. A process which comprises reacting as the sole reactants in the process an orthopolymethylene benzene selected from the group consisting of indans, 1,2,3,4-tetrahydronaphthalenes, 1,2,3,4 - tetrahydroanthracenes and 1,2,3,4-tetrahydrophenanthrenes with a compound selected from the group consisting of polyhaloalkanes in which at least two halogen atoms are on the same carbon atom and haloalkenes in the presence of a Friedel-Crafts type catalyst, and recovering the resultant reaction products.

3. A process which comprises reacting as the sole reactants in the process an orthopolymethylene benzene selected from the group consisting of indans, 1,2,3,4-tetrahydronaphthalenes, 1,2,3,4 - tetrahydroanthracenes and 1,2,3,4-tetrahydrophenanthrenes with a compound selected from the group consisting of polyhaloalkanes in which at least two halogen atoms are on the same carbon atom and haloalkenes in the presence of aluminum chloride, and recovering the resultant reaction products.

4. A process which comprises reacting as the sole reactants in the process an orthopolymethylene benzene selected from the group consisting of indans, 1,2,3,4-tetrahydronaphthalenes, 1,2,3,4 - tetrahydroanthracenes and 1,2,3,4-tetrahydrophenanthrenes with a compound selected from the group consisting of polyhaloalkanes in which at least two halogen atoms are on the same carbon atom and haloalkenes in the presence of ferric chloride, and recovering the resultant reaction products.

5. A process which comprises reacting the sole reactants in the process an orthopolymethylene benzene selected from the group consisting of indans, 1,2,3,4-tetrahydronaphthalenes, 1,2,3,4 - tetrahydroanthracenes and 1,2,3,4-tetrahydrophenanthrenes with a compound selected from the group consisting of polyhaloalkanes in which at least two halogen atoms are on the same carbon atom and haloalkenes in the presence of boron trifluoride, and recovering the resultant reaction products.

6. A process which comprises reacting as the sole reactants in the process a tetrahydronaphthalene with a compound selected from the group consisting of polyhaloalkanes in which at least two halogen atoms are on the same carbon atom and haloalkenes in the presence of aluminum chloride, and recovering the resultant reaction products.

7. A process which comprises reacting as the sole reactants in the process an indan with a compound selected from the group consisting of polyhaloalkanes in which at least two halogen atoms are on the same carbon atom and haloalkenes in the presence of aluminum chloride, and recovering the resultant reaction products.

8. A process which comprises reacting as the sole reactants in the process 1,2,3,4-tetrahydronaphthalene with a compound selected from the group consisting of polyhaloalkenes in which two halogen atoms are on the same carbon atom and haloalkenes in the presence of aluminum chloride, and recovering the resultant reaction products.

9. A process which comprises reacting as the sole reactants in the process indane with a compound selected from the group consisting of polyhaloalkanes in which at least two halogen atoms are on the same carbon atom and haloalkenes in the presence of aluminum chloride, and recovering the resultant reaction products.

10. A process which comprises reacting as the sole reactants in the process 1,2,3,4-tetrahydronaphthalene with 1,1-dichloroethane in the presence of aluminum chloride, and recovering the resultant reaction products.

11. A process which comprises reacting as the sole reactants in the process 1,2,3,4-tetrahydronaphthalene with 1,1-dichloro-3,3-dimethylbutane in the presence of aluminum chloride, and recovering the resultant reaction products.

12. A process which comprises reacting as the sole reactants in the process 1,2,3,4-tetrahydronaphthalene with allyl chloride in the presence of aluminum chloride, and recovering the resultant reaction products.

13. A process which comprises reacting as the sole reactants in the process 1,2,3,4-tetrahydronaphthalene with methallyl chloride in the presence of aluminum chloride, and recovering the resultant reaction products.

References Cited in the file of this patent
UNITED STATES PATENTS

| 2,759,028 | Schmerling | Aug. 14, 1956 |
| 2,759,029 | Schmerling | Aug. 14, 1956 |
| 2,759,030 | Schmerling | Aug. 14, 1956 |

OTHER REFERENCES

Boedtker et al.: Bulletin de la Societé Chimique de France, vol. 35 (1924), page 633 relied on.

Schroeter: Berichte der Deutschen Chemischen Gesellschaft, vol. 57 (1924), pages 1990 and 2002 relied on.

Barbot: Bulletin de la Societe Chimique de France, vol. 47, 1930 (page 1317 relied on).